United States Patent [19]

Martin et al.

[11] Patent Number: 5,016,962
[45] Date of Patent: May 21, 1991

[54] METHOD OF REPAIRING AN OPTICAL FIBER

[75] Inventors: Donald J. Martin, Fremont; Ralph A. Narciso, Woodside; David T. Lowe, Mill Valley; Clifford H. Greenman, Palo Alto, all of Calif.

[73] Assignee: Raynet Corporation, Menlo Park, Calif.

[21] Appl. No.: 495,661

[22] Filed: Mar. 19, 1990

[51] Int. Cl.⁵ .................................................. G02B 6/02
[52] U.S. Cl. .............................. 350/96.16; 350/96.15; 350/320
[58] Field of Search .............. 350/96.15, 96.16, 96.20, 350/96.21, 96.22, 96.23, 96.29, 96.10, 320

[56] References Cited

U.S. PATENT DOCUMENTS 4,166,946  9/1979  Chown et al. ............... 350/96.16 X
4,557,550 12/1985  Beals et al. ...................... 350/96.15
4,580,874  4/1986  Winter et al. .................... 350/96.21
4,585,304  4/1986  Winter et al. .................... 350/96.21
4,699,460 10/1987  Szentesi ............................ 350/96.21
4,728,169  3/1988  Campbell et al. ................ 350/96.15
4,728,171  3/1988  Schofield et al. ............... 350/96.20
4,741,585  5/1988  Uken ................................ 350/96.15
4,824,199  4/1989  Uken ................................ 350/96.15

FOREIGN PATENT DOCUMENTS 2064503 12/1970 Fed. Rep. of Germany .

*Primary Examiner*—John D. Lee

[57] ABSTRACT

A method of providing optical signal transmission past an optical fiber section in need of repair includes withdrawing an optical signal from the fiber upstream of the section and injecting the signal into the fiber downstream of the section in a passive manner while the section is being repaired.

8 Claims, 1 Drawing Sheet

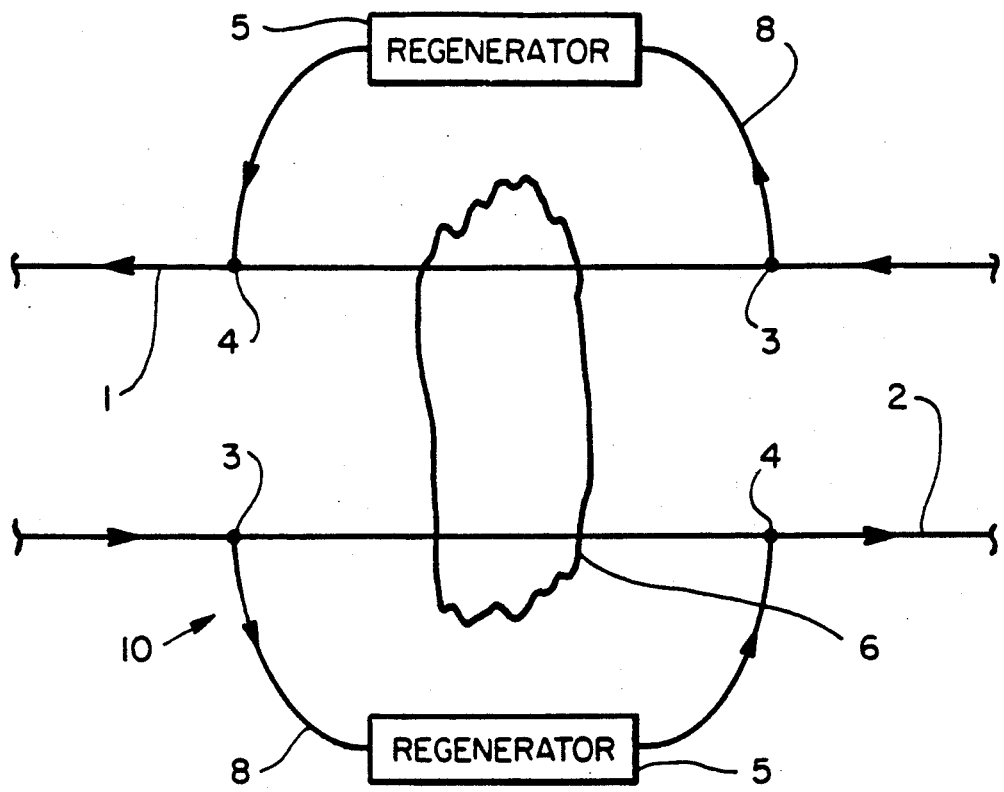
FIG_1
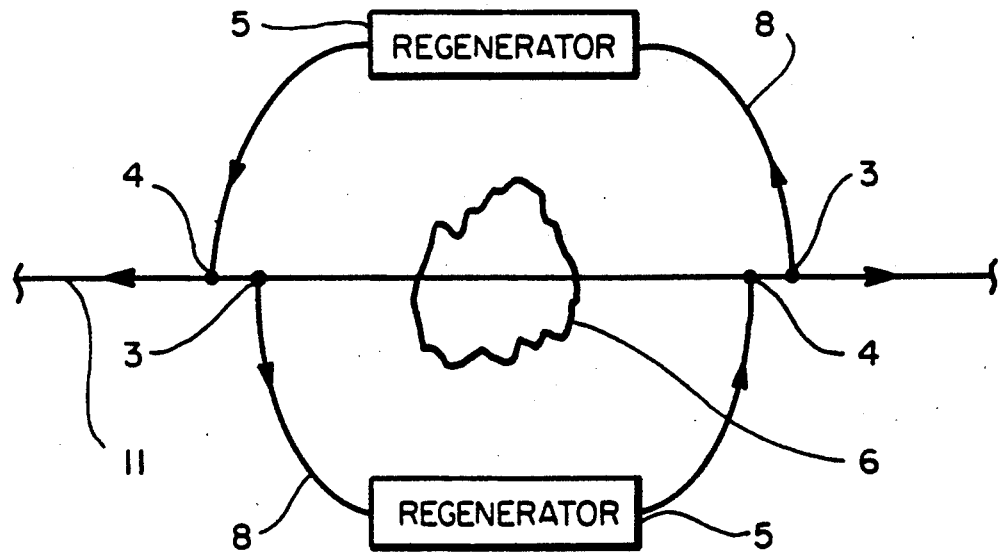
FIG_2

METHOD OF REPAIRING AN OPTICAL FIBER

BACKGROUND OF THE INVENTION

The present invention relates to a method and apparatus for maintaining optical signal transmission in an optical fiber which is or will be in need of repair.

Optical fibers are quickly becoming widely used for transmitting information rather than electrical wires in view of the superior bandwidth capabilities of optical fiber and its inherent EMI and RFI immunity. Because of its high bandwidth capability however, a problem exists in the art when an optical fiber is in need of repair since during the repair operation optical signal transmission is interrupted which causes an associated relatively large expense due to the amount of information which is unnecessarily delayed or worse yet lost.

SUMMARY OF THE INVENTION

Accordingly, it is an object of the present invention to provide an optical fiber repair bypass which allows a section of an optical fiber to be repaired to be conveniently bypassed so as to continue signal transmission and prevent any significant signal transmission delays and associated costs.

It is another object of the invention to prevent any loss of service to users of an optical fiber network during a repair operation.

These and other objects are achieved by providing optical signal transmission in an alternative optical fiber bridge which bypasses and hence substitutes for a section of an optical fiber network not capable of transmitting optical signals and in need of repair. The steps are:

attaching a first passive coupler at a location on a network fiber upstream of the damaged optical section for withdrawing optical signals out of a core of the network optical fiber by passing the signals through a fiber cladding of the network fiber;

attaching a second passive coupler at a location on the network fiber downstream of the damaged optical section for injecting the optical signal withdrawn into the network optical fiber and specifically into its core by passing the signal through the network optical fiber cladding;

optically connecting the first coupler to the second coupler so as to allow the optical signal withdrawn by the first coupler to be injected by the second coupler;

repairing the section so as to enable optical signal transmission therethrough; and removing the first and seocnd couplers from the optical fiber locations.

BRIEF DESCRIPTION OF THE DRAWINGS

FIG. 1 illustrates a preferred embodiment of the invention where a fiber network includes two fibers; and FIG. 2 illustrates a second preferred embodiment where the fiber network includes a bidirectional fiber.

DESCRIPTION OF THE PREFERRED EMBODIMENT

FIG. 1 illustrates a first preferred embodiment of the invention whereby an optical fiber network 10 comprised a first optical fiber 1 transmitting information to the left and a second optical fiber 2 transmitting information to the right so as to provide two way communication to telecommunication units (not shown). Reference numeral 6 illustrates an area or section of fiber breakage or an optical fiber section in need of repair or which is going to be worked on and could break in the process of such work and cause a loss of service. Fiber breakage can occur unintentionally or intentionally. Unintentional breakages can occur when cables are inadvertently severed and intentional breakages can occur when it is necessary to do planned maintenance, such as rerouting cables over new right-of-way routes which often occurs subsequent to major developments, such as the building of new bridges or the construction of new buildings. Any time an optical fiber transmitting high bandwidth information is broken the delay in information transfer can be substantial, especially when the repair or rerouting and repair takes several hours, and hence such loss of service can be very expensive.

According to the invention, transmission interruption is positively prevented by attached passive read couplers 3 and write couplers 4 to the optical fiber upstream and downstream (relative to a direction of signal propagation), respectively, of the area of fiber section 6.

The read couplers 3 and the write couplers 4 preferably are constructed so as to non-invasively couple light from and into an optical fiber core by passing the light through a side of the fiber cladding and a side of the fiber buffer and optionally through a side of a fiber jacket (assuming the jacket is transparent), all preferably at a fiber bend, most preferably by utilizing optical coupling materials at an outside surface of the fiber bends for index matching to an outer surface of the optical fiber, e.g. its buffer or thin jacket or cladding. Preferred tap constructions are described in U.S. Pat. Nos. 4,741,585; 4,824,199; 4,728,169; and U.S. application Ser. Nos. 346,185 filed 5/2/89 abandoned; 213,642 filed 6/30/88abandoned; and 455,111 filed 12/22/89 now U.S. Pat. No. 4,981,334, the disclosures of which are all incorporated herein by reference. Accordingly, when a section of an optical fiber network is to be intentionally severed for rerouting, according to the invention read couplers 3 are attached to the optical fiber at a location upstream relative to the direction of data or signal transmission to the area where the fiber section is to be broken, and the write couplers 4 are attached to the optical fiber at a location downstream relative to the direction of data or signal transmission of the optical fiber section to be repaired, and the couplers 3, 4 are optically interconnected so as to allow optical signals to be routed around the section 6. According to a preferred embodiment, the optical signals are optically amplified by regeneration by optical fiber regenerator 5 so as to improve signal-to-noise ratios when detection of the optical signals is eventually required, though the regenerator 5 is not necessary where adequate bypass signal strength is obtained by use of the couplers 3, 4.

When an optical signal regenerator 5 is utilized, conventionally it is necessary for the optical signals withdrawn by the couplers 3 to be amplified using conventional photo detectors and photo-diodes, either light emitting diodes or lasers. Subsequent to attaching the couplers 3, 4 and optically interconnecting them by optionally incorporating the regenerator 5, the optical fibers can then be broken at the section 6 and rerouted as desired and then subsequently optically reconnected. Thereafter, the couplers 4 are preferably first removed so as to disconnect the bypass loop 8, and then subsequently the read couplers 3 can be removed. Alternatively, the read couplers 3 can first be removed, though according to this embodiment the regenerator 5 could introduce undesired noise by virtue of transmission through the write couplers 4.

In the case of an unintentional breakage of a section 6, according to the invention the couplers 3, 4 and the regenerator 5 and the connecting bypass loop 8 are attached as illustrated as soon as practical to restore optical signal transmission past the section 6 so that data, voice, and/or video transmission is interrupted for as short a time as is possible. Thereafter, the section 6 is repaired, and the couplers removed, as previously described.

According to a second embodiment of the invention illustrated in FIG. 2, a bidirectional fiber 11 having information going in opposite directions simultaneously as indicated by arrows oftentimes has a section 6 which needs to be rerouted, repaired, or worked on. In this case, couplers 3, 4 and interconnect fibers 8 as well as regenerators 5 can be arranged as illustrated so as to include continuity of transfer of signal information in both directions. Since the couplers preferred for use with the invention couple through a side of an optical fiber at a bend, a throughput loss of the couplers in general is minimal and arranging multiplicity of couplers in series as proposed does not significantly adversely affect the utility of the invention.

The invention should not be limited to bypassing a section 6 of an optical fiber network where the network includes only one or two fibers, but can also be expanded to bridge as many optical fibers as is necessary, the number generally corresponding to a maximum generally corresponding to the number of fibers in a cable located at the section 6 to be worked on since any time you are working on a cable conceivably accidental severing of all fibers therein could occur, though according to a peferred embodiment, especially where simply a few fibers are being rerouted whereas other fibers in the cable are simply being expressed therethrough, the bypass section 8 and associated couplers and regenerators would only need to be placed on those fibers where loss of service is most expected.

Though the invention has been described by reference to certain preferred embodiments thereof, it should be understood that the invention is not to be limited thereby and is only to be limited by the appended claims.

We claim:

1. A method of insuring optical signal transmission in an optical fiber network which has a fiber section which may not be capable of transmitting optical signals and may be in need of work, comprising the steps of:
    attaching a first passive coupler at a location upstream of the fiber section for withdrawing an optical signal out of a core of the optical fiber by passing the signal through a side of a fiber cladding;
    attaching a second passive coupler at a location downstream of the fiber section for injecting the withdrawn optical signal into the optical fiber core by passing the signal through the side of an optical fiber cladding;
    optically connecting the first coupler to the second coupler so as to allow the optical signal withdrawn by the first coupler to be injected by the second coupler;
    repairing the section so as to enable optical signal transmission therethrough;
    attaching third and fourth couplers for reading and writing, respectively, onto a further fiber traversing the fiber section and optically interconnecting these third and fourth couplers so as to allow a further optical signal in the further fiber to bypass the section by being withdrawn by the third coupler and being injected by the fourth coupler;
    removing the first, second, third, and fourth couplers from the optical fibers subsequent to completing the work on the fiber section.

2. The method of claim 1, further comprising the step of regenerating the optical signal withdrawn by the first coupler prior to the withdrawn signal being injected by the second coupler.

3. The method of claim 1, the work comprising the step of breaking the optical fiber at the section subsequent to attaching the first and second couplers so as to allow the optical fiber to be rerouted, and rerouting the optical fiber section subsequent to breaking it, the section being repaired subsequent to being rerouted.

4. The method of claim 1, the first and second passive couplers withdrawing and injecting the optical signal, respectively, by passing the signal through a side of a buffer of the fiber at a fiber bend.

5. The method of claim 4, further comprising the steps of:
    attaching the third coupler adjacent the second passive coupler and attaching the fourth coupler at a location adjacent the first passive coupler, the third coupler being capable of withdrawing a further optical signal from the optical fiber core by passing the signal through the side of the optical fiber cladding, the fourth coupler being capable of injecting the further withdrawn optical signal into the core of the optical fiber by passing the further signal through the side of the fiber cladding, so as to insure two-way communication through the section.

6. The method of claim 1, the optical fiber being used for transmitting information in a bus architecture.

7. The method of claim 1, the optical fiber being used for transmitting information in a ring architecture.

8. The method of claim 1, the optical fiber being used for transmitting information in a star architecture.

* * * * *